(12) United States Patent
Lee

(10) Patent No.: US 9,310,666 B2
(45) Date of Patent: Apr. 12, 2016

(54) OPTICAL IMAGE STABILIZING APPARATUS AND PHOTOGRAPHING APPARATUS HAVING THE SAME

(71) Applicant: Samsung Electronics Co., Ltd., Suwon-si (KR)

(72) Inventor: Seung-hwan Lee, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/845,868

(22) Filed: Sep. 4, 2015

(65) Prior Publication Data

US 2016/0070152 A1 Mar. 10, 2016

(30) Foreign Application Priority Data

Sep. 5, 2014 (KR) .................. 10-2014-0119366

(51) Int. Cl.
*G03B 17/00* (2006.01)
*G03B 5/00* (2006.01)
*G03B 17/14* (2006.01)

(52) U.S. Cl.
CPC ........ *G03B 5/00* (2013.01); *G03B 17/14* (2013.01); *G03B 2205/0015* (2013.01)

(58) Field of Classification Search
CPC ............................................. G03B 2205/0015
See application file for complete search history.

(56) References Cited

U.S. PATENT DOCUMENTS

| | | | |
|---|---|---|---|
| 5,398,132 A | 3/1995 | Otani | |
| 5,633,756 A * | 5/1997 | Kaneda et al. | G02B 27/646 348/E5.046 |
| 5,758,203 A * | 5/1998 | Konno | G03B 5/00 396/55 |
| 5,771,069 A * | 6/1998 | Kobayashi | G02B 27/646 348/208.11 |
| 5,859,665 A | 1/1999 | Hibi | |
| 6,400,902 B1 | 6/2002 | Usui | |
| 6,718,131 B2 * | 4/2004 | Okazaki et al. | G03B 5/00 348/E5.046 |
| 6,970,305 B2 | 11/2005 | Katagishi et al. | |
| 7,123,290 B2 | 10/2006 | Ohishi | |
| 7,755,666 B2 | 7/2010 | Noji | |
| 7,991,276 B2 | 8/2011 | Sato | |
| 8,441,725 B2 | 5/2013 | Yasuda | |
| 2012/0127575 A1 * | 5/2012 | Honma | G02B 27/646 359/554 |
| 2013/0163973 A1 * | 6/2013 | Tanaka | G03B 5/00 396/55 |

* cited by examiner

*Primary Examiner* — W B Perkey
(74) *Attorney, Agent, or Firm* — McAndrews Held & Malloy, Ltd.

(57) ABSTRACT

An optical image-stabilizing apparatus includes: an optical image-stabilizing unit including a movement frame and a support frame supporting the movement frame to be movable in a direction perpendicular to an optical axis; and a locking unit capable of locking the movement frame to not be moved in the direction perpendicular to the optical axis, wherein the locking unit includes: a locking barrel movable in a direction parallel to the optical axis and configured to limit movement of the movement frame according to a position in the direction parallel to the optical axis; a driving barrel rotatable and configured to transfer a driving force to the locking barrel so that the locking barrel is moved in the direction parallel to the optical axis; and a guide barrel between the locking barrel and the driving barrel and including rectilinear guide portions that extend in the direction parallel to the optical axis so that the locking barrel is moved in the direction parallel to the optical axis.

20 Claims, 16 Drawing Sheets

OPTICAL IMAGE STABILIZING APPARATUS AND PHOTOGRAPHING APPARATUS HAVING THE SAME

CROSS-REFERENCE TO RELATED APPLICATION

This application claims the benefit of Korean Patent Application No. 10-2014-0119366, filed on Sep. 5, 2014, in the Korean Intellectual Property Office, the disclosure of which is incorporated herein in its entirety by reference.

BACKGROUND

The present disclosure relates to optical image-stabilizing apparatuses and photographing apparatuses having the same.

As photographing apparatuses, such as digital cameras or digital video cameras, have become widely used, consumer demand for obtaining high-quality still images or moving pictures has gradually increased. In particular, in order to prevent image definition from deteriorating due to a user's hand shaking, demand for photographing apparatuses having optical image-stabilizing apparatuses has increased.

Optical image-stabilizing apparatuses move an image-capturing device, which photoelectrically converts an image of a subject formed by a lens constituting a part of a photographing optical system or the photographing optical system, with respect to an optical axis, and correct a phase difference.

However, when the user does not select a phase difference correction, or the power of the photographing apparatus's power is turned off, movement of the lens or image-capturing device may be limited, and, the optical image-stabilizing apparatuses may be supported at the center of a range of movement.

SUMMARY

Provided are optical image-stabilizing apparatuses having a locking unit that moves in a direction parallel to an optical axis and limits movement of an optical image-stabilizing unit, whereby locking the optical image-stabilizing unit has stable characteristics. Also provided are photographing apparatuses having the optical image-stabilizing apparatuses.

Additional aspects will be set forth in the description which follows and, in part, will be apparent from the description, or may be learned by practice of the presented exemplary embodiments.

According to an aspect of an exemplary embodiment, an optical image-stabilizing apparatus includes: an optical image-stabilizing unit including a movement frame and a support frame that enables the movement frame to be movable in a direction perpendicular to an optical axis; and a locking unit that is capable of locking the movement frame such that it is not to be moved in the direction perpendicular to the optical axis. The locking unit includes: a locking barrel that is movable in a direction parallel to the optical axis and limits movement of the movement frame according to a position in the direction parallel to the optical axis; a driving barrel that is rotatable and transfers a driving force to the locking barrel so that the locking barrel is moved in the direction parallel to the optical axis; and a guide barrel that is disposed between the locking barrel and the driving barrel and includes rectilinear guide portions that extend in the direction parallel to the optical axis so that the locking barrel is moved in the direction parallel to the optical axis.

The locking barrel may include at least one locking pin protruding toward the movement frame, and the movement frame may include at least one insertion portion into which at least a part of the locking pin is inserted.

When the driving barrel is rotated in a first direction, the locking pin of the locking barrel may be inserted into the insertion portion of the movement frame, and when the driving barrel is rotated in a second direction, the locking pin of the locking barrel may be detached from the insertion portion of the movement frame.

A plurality of inclination guide portions, at least a part of which are inclined with respect to the optical axis, may be formed in one of the driving barrel and the locking barrel, and a plurality of movement pins inserted into the plurality of inclination guide portions may be formed in the other one of the driving barrel and the locking barrel.

The plurality of movement pins may pass through the rectilinear guide portions and may be inserted into the inclination guide portions.

The inclination guide portions may include: an inclination section that extends in a direction in which the inclination guide portions are inclined with respect to the optical axis; and first and second extension sections that are disposed on both ends of the inclination section and extend in the direction perpendicular to the optical axis.

The optical image-stabilizing apparatus may further include a driving portion that provides a rotational driving force to the driving barrel.

The driving portion may include at least one of a step motor and a voice coil motor (VCM).

The driving barrel may be disposed at an outer edge of the locking barrel.

The movement frame and the locking barrel may be disposed in the direction parallel to the optical axis.

The locking unit may further include a position sensor that detects a position of the driving barrel.

According to an aspect of another exemplary embodiment, a photographing apparatus includes the above-described optical image-stabilizing apparatus.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
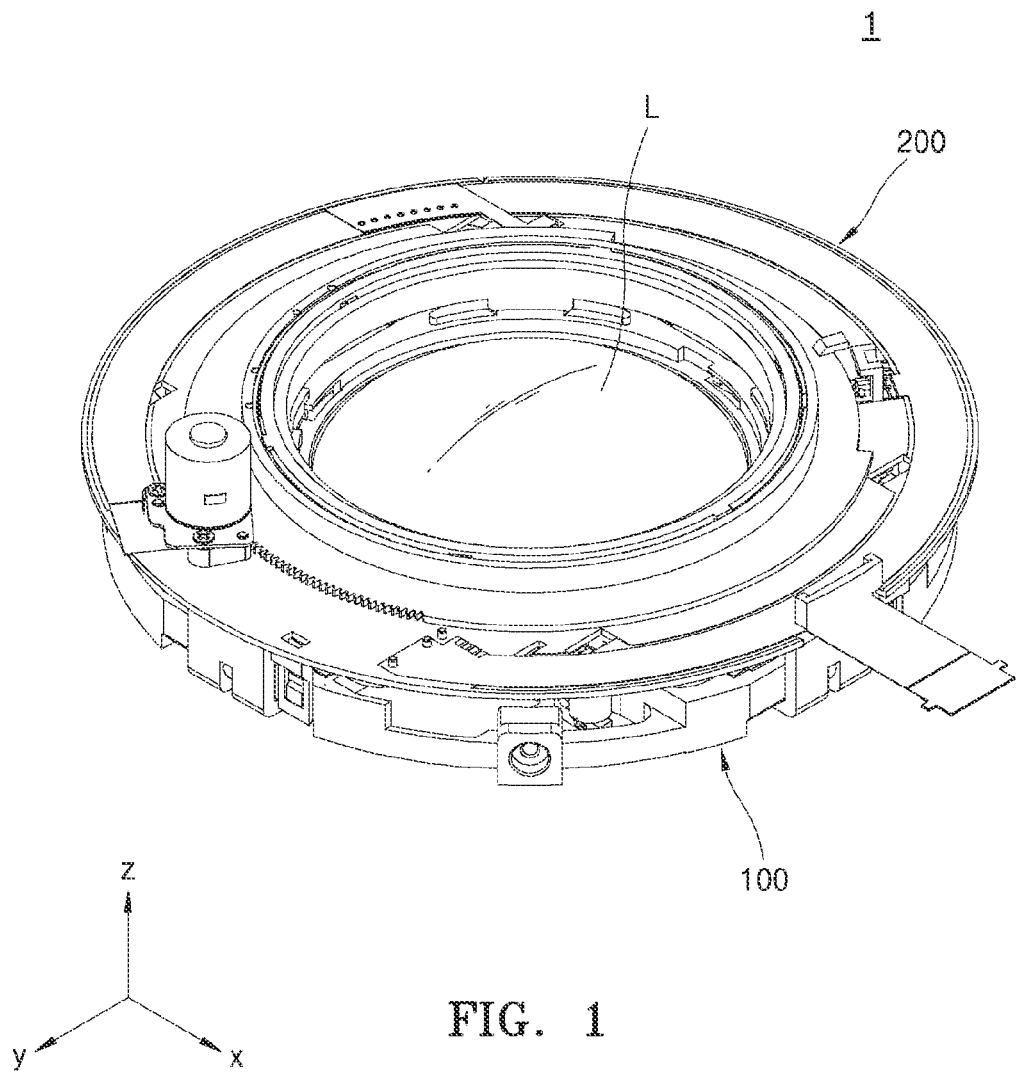
FIG. 1 is a perspective view of an assembled optical image-stabilizing apparatus according to an exemplary embodiment.

Reference will now be made in detail to exemplary embodiments, examples of which are illustrated in the accompanying drawings. In addition, an optical image-stabilizing apparatus and a photographing apparatus having the same according to exemplary embodiments will be described in detail with reference to the accompanying drawings. Like reference numerals or marks in the drawings refer to like components or elements that perform substantially the same functions.

While such terms as "first," "second," etc., may be used to describe various components, such components must not be limited to the above terms. The above terms are used only to distinguish one component from another. For example, a first element could be termed a second element without departing from the teachings of exemplary embodiments, and similarly, a second element could be termed a first element. The term "and/or" includes any and all combinations of one or more of the associated listed items.

The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. Expressions such as "at least one of," when preceding a list of elements, modify the entire list of elements and do not modify the individual elements of the list.

Figure 2:
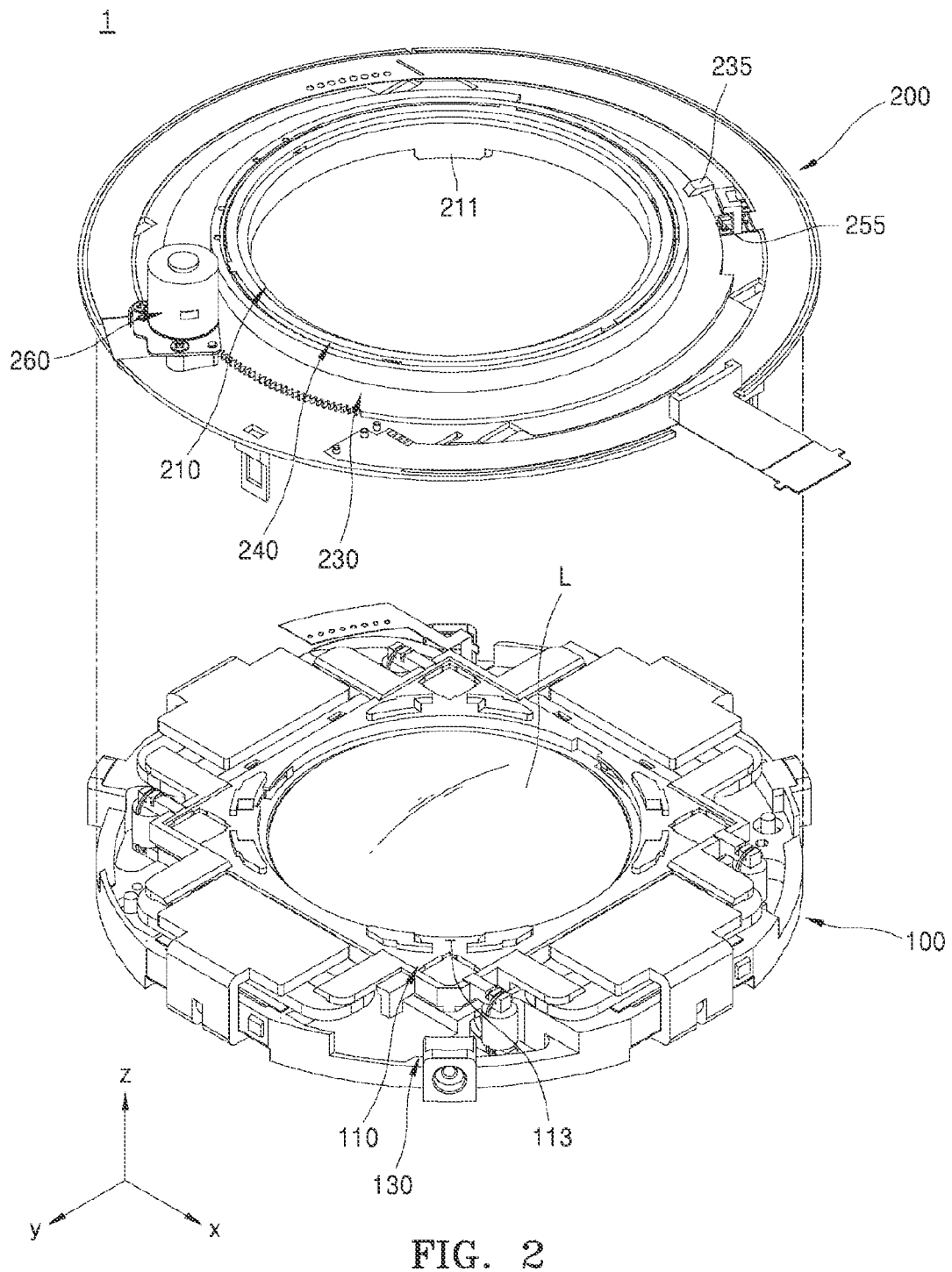
FIG. 2 is an exploded perspective view of the optical image-stabilizing apparatus illustrated in FIG. 1.
Figure 3:
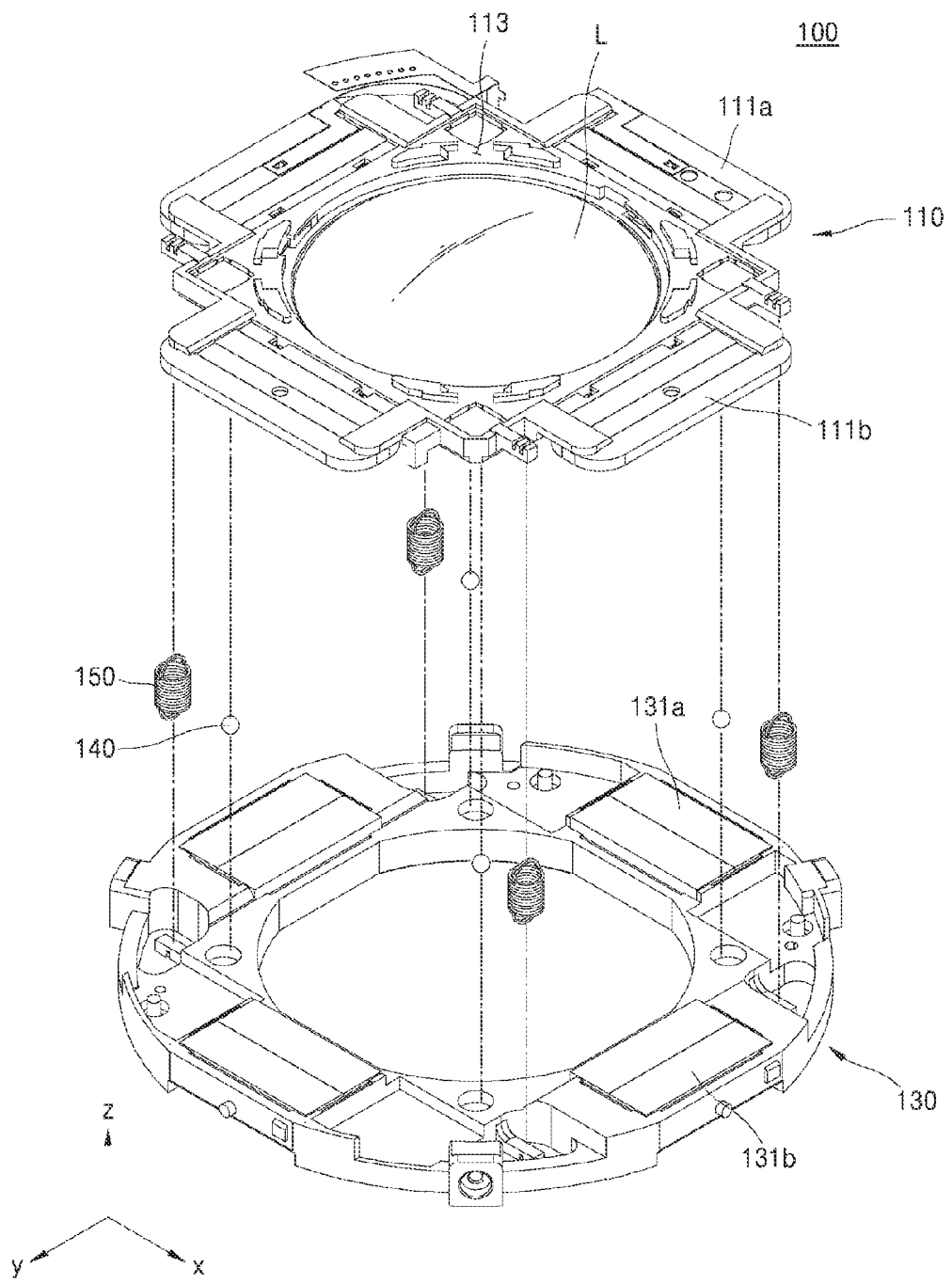
FIG. 3 is an exploded perspective view of an optical image-stabilizing unit of the optical image-stabilizing apparatus of FIG. 1.
Figure 4:
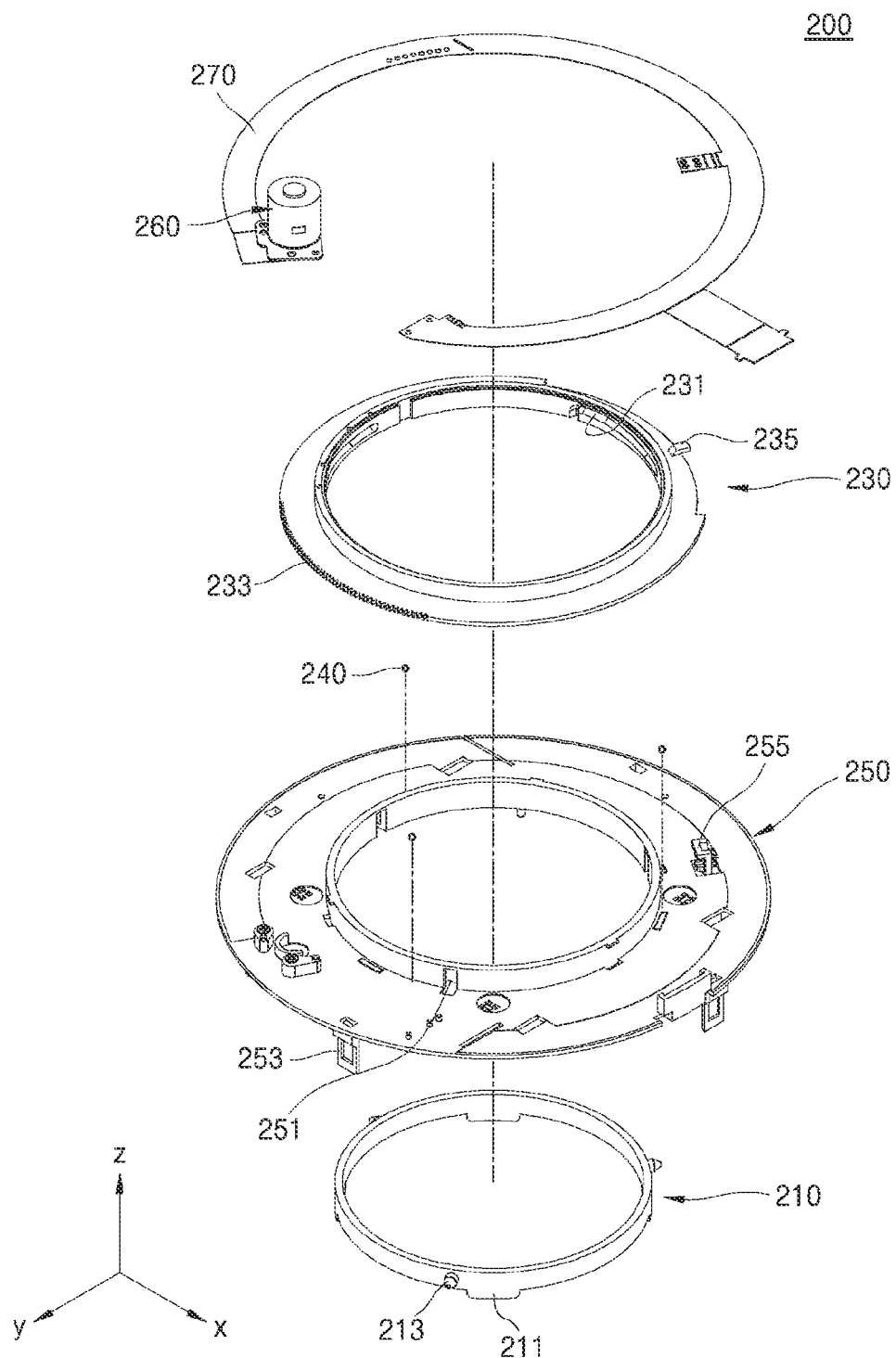
FIG. 4 is an exploded perspective view of a locking unit of the optical image-stabilizing apparatus of FIG. 1.

FIG. 1 is a perspective view of an assembled optical image-stabilizing apparatus 1 according to an exemplary embodiment, and FIG. 2 is an exploded perspective view of the optical image-stabilizing apparatus 1 of FIG. 1. FIG. 3 is an exploded perspective view of an optical image-stabilizing unit 100 of the optical image-stabilizing apparatus 1, and FIG. 4 is an exploded perspective view of a locking unit 200 of the optical image-stabilizing apparatus 1 of FIG. 1.

Referring to FIGS. 1 and 2, the optical image-stabilizing apparatus 1 according to the current embodiment may perform a function of correcting the effect of shaking that occurs by a hand shaking when photographing. The optical image-stabilizing apparatus 1 according to the current embodiment may perform a function of limiting movement of a lens L or an image-capturing device when an optical image-stabilizing function is not necessary or power of a photographing apparatus is turned off.

The optical image-stabilizing apparatus 1 includes an optical image-stabilizing apparatus 100 that performs the optical image-stabilizing function, and a locking unit 200 that limits movement of a movement frame 110 (FIG. 2) that is a member for supporting the lens L or the image-capturing device in the optical image-stabilizing unit 100.

The optical image-stabilizing unit 100 and the locking unit 200 may be disposed in a direction parallel to an optical axis z.

Referring to FIGS. 2 and 3, the optical image-stabilizing unit 100 includes the movement frame 110 and a support frame 130 that enables the movement frame 110 to be movable.

At least one lens L may be fixed to the movement frame 110. In another embodiment, the image-capturing device, instead of the lens L, may also be fixed to the movement frame 110, although not shown.

The support frame 130 may support the movement frame 110 to be movable in first and second directions x and y perpendicular to the optical axis z. The movement frame 110 may be movable in the first and second directions x and y perpendicular to the optical axis z with respect to the support frame 130. The first direction x and the second direction y may be perpendicular to the optical axis z and may cross each other.

Magnets 131a and 131b (FIG. 3) may be assembled on the support frame 130, and driving coils 111a and 111b that face the magnets 131a and 131b, may be assembled on the movement frame 110. Due to an electromagnetic interaction between the magnets 131a and 131b and the driving coils 111a and 111b, the movement frame 110 may be moved in the first and second directions x and y perpendicular to the optical axis z. A circuit board (not shown) that applies electrical signals may be connected to the driving coils 111a and 111b.

A plurality of ball bearings 140 may be disposed between the support frame 130 and the movement frame 110. Through the plurality of ball bearings 140, the support frame 130 and the movement frame 110 may be smoothly moved in the directions x and y perpendicular to the optical axis z while maintaining a predetermined distance between them.

The support frame 130 and the movement frame 110 may be connected by an elastic member 150. The elastic member 150 may elastically support the movement frame 110 with respect to the support frame 130 when the support frame 130 and the movement frame 110 maintain a predetermined distance.

A plurality of insertion portions 113 may be formed on the movement frame 110. The plurality of insertion portions 113 may be inserted in a direction perpendicular to the optical axis z.

The insertion portions 113 may be formed on a surface that faces the locking unit 200 (FIG. 4). For example, the insertion portions 113 may be formed on a top surface of the movement frame 110. However, arrangement of the insertion portions 113 is not limited thereto and may be modified according to the shape of the movement frame 110 or arrangement of the locking unit 200.

Referring to FIGS. 2 and 4, the locking unit 200 may include a locking barrel 210, a driving barrel 230, and a guide barrel 250 that is disposed between the locking barrel 210 and the driving barrel 230 and guides movement of the locking barrel 210.

The locking barrel 210 may be moved in the direction parallel to the optical axis z and optionally limits movement of the movement frame 110 according to a position in the direction parallel to the optical axis z.

The locking barrel 210 may include at least one locking pin 211 that protrudes in the direction parallel to the optical axis z. The locking pin 211 may protrude in a direction of the movement frame 110. For example, when the movement frame 110 is disposed under the locking barrel 210, the locking pin 211 may protrude in a downward direction.

At least a part of the locking pin 211 may be inserted into the insertion portions 113 of the movement frame 110. The locking pin 211 may be inserted into the insertion portions 113 so that movement of the movement frame 110 in the directions x and y perpendicular to the optical axis z may be limited.

A plurality of locking pins 211 may be present. For example, four locking pins 211 may be present. The plurality of locking pins 211 are inserted into the insertion portions 113 corresponding to the locking pins 211 so that movement of the movement frame 110 in the directions x and y perpendicular to the optical axis z of the movement frame may be more securely limited.

The locking barrel 210 may include a plurality of movement pins 213 that protrude in a radial direction. For example, the locking barrel 210 may include three movement pins 213. The plurality of movement pins 213 may be disposed in a circumferential direction of the locking barrel 210 to be spaced apart from each other by a predetermined distance.

The driving barrel 230 that is rotatable may be disposed at an outer edge of the locking barrel 210. The driving barrel 230 performs a function of transferring a driving force to the locking barrel 210.

In order to transfer the driving force to the locking barrel 210, the driving barrel 230 includes a plurality of inclination guide portions 231. At least a part of the plurality of inclination guide portions 231 are formed to be inclined with respect to the optical axis z, and the movement pins 213 of the locking barrel 210 are inserted into the inclination guide portions 231. As the driving barrel 230 is rotated, the movement pins 213 of the locking barrel 210 may be moved in a vertical direction along the optical axis z according to the shape of the inclination guide portions 231.

A guide barrel 250 may be disposed between the locking barrel 210 and the driving barrel 230. The guide barrel 250 may include rectilinear guide portions 251 that extend in a direction parallel to the optical axis z. The movement pins 213 pass through the straight guide portion 215 and are inserted into the inclination guide portions 231. The rectilinear guide portions 251 guide a rectilinear movement in a direction parallel to the optical axis z of the movement pins 213.

Ball bearings 240 may be disposed between the driving barrel 230 and the guide barrel 250. Through the ball bearings 240, the driving barrel 230 may be smoothly rotated with respect to the guide barrel 250.

The guide barrel 250 may also not rotate, and a position of the guide barrel 250 may be fixed. For example, the guide barrel 250 may be fixed to the support frame 130 of the optical image-stabilizing unit 100. To this end, the guide barrel 250 may include a plurality of coupling portions 253 to be fixed on the support frame 130.

A driving portion 260 may be connected to the driving barrel 230. In one example, the driving portion 260 may be disposed at an outer edge of the driving barrel 230. A gear portion 233 may be formed at at least a part of an outer circumferential surface of the driving barrel 230. The driving portion 260 and the gear portion 233 are connected to each other so that the driving barrel 230 may be rotated by a driving force transferred from the driving portion 260. A printed circuit board (PCB) 270 that applies electrical signals may be connected to the driving portion 260.

The driving portion 260 may be bilaterally rotated. Thus, the driving barrel 230 connected to the driving portion 260 may be bilaterally rotated.

As the driving portion 260 rotates in one direction, the driving barrel 230 connected to the driving portion 260 is rotated in a first direction, for example, clockwise. When the driving barrel 230 is rotated in the first direction, the movement pins 213 of the locking barrel 210 inserted into the inclination guide portions 231 of the driving barrel 230 are moved along the shape of the inclination guide portions 231. Through the rectilinear guide portions 251 of the guide barrel 250, movement of the movement pins 213 in a direction crossing the optical axis z, is limited. Thus, the locking barrel 210 descends in the direction parallel to the optical axis z and approaches the movement frame 110. Locking pins 211 of the locking barrel 210 are inserted into the insertion portions 113 of the movement frame 110. As a result, movement of the movement frame 110 in the directions x and y perpendicular to the optical axis z is limited.

On the other hand, as the driving portion 260 rotates in an opposite direction to one direction, the driving barrel 230 connected to the driving portion 260 is also rotated in a second direction that is opposite to the first direction. When the driving barrel 230 is rotated in the second direction, the movement pins 213 of the locking barrel 210 inserted into the inclination guide portions 231 of the driving barrel 230 are moved along the shape of the inclination guide portions 231. Through the rectilinear guide portions 251 of the guide barrel 250, movement of the movement pins 213 in the direction crossing the optical axis z, is limited. Thus, the locking barrel 210 ascends in the direction parallel to the optical axis z and is far away from the movement frame 110. The locking pins 211 of the locking barrel 210 are detached from the insertion portions 113 of the movement frame 110. As a result, movement of the movement frame 110 in the directions x and y perpendicular to the optical axis z is not limited.

A locked state in which movement of the movement frame 110 is limited by the locking unit 200 and an unlocked state in which movement of the movement frame 110 is not limited, will be described in detail with reference to FIGS. 5A, 5B, 6A, and 6B.

Figure 5A:
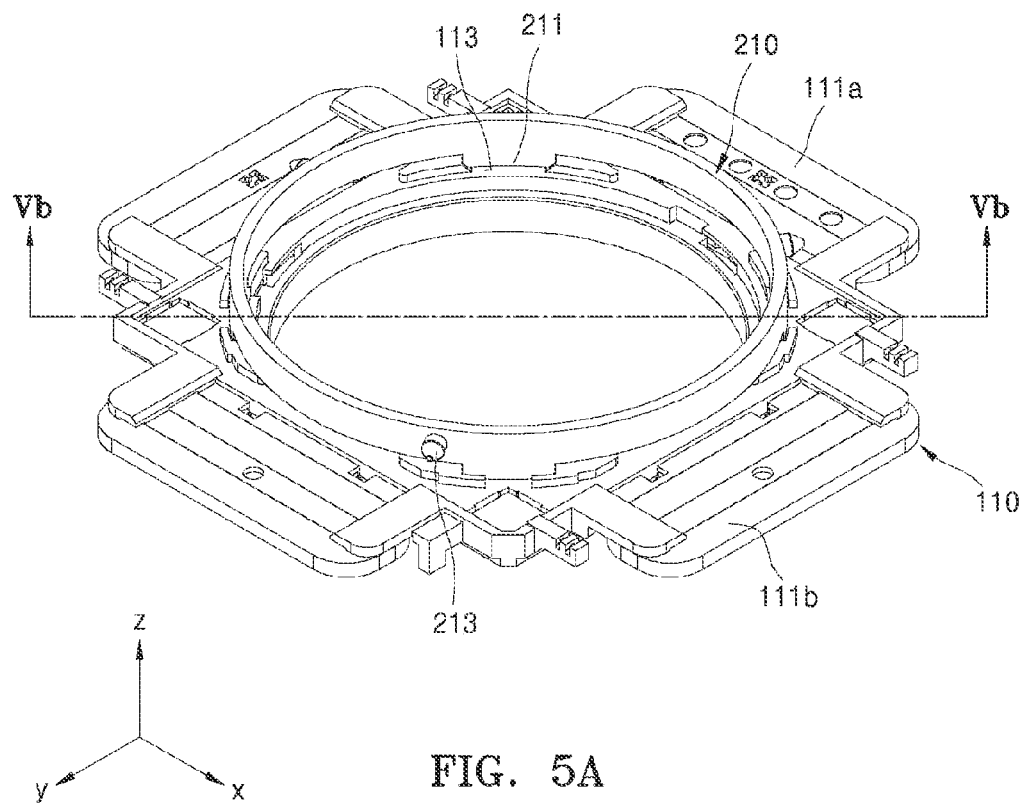
FIGS. 5A and 5B are perspective views and cross-sectional views schematically illustrating a locked state of the optical image-stabilizing apparatus of FIG. 1 in which movement of a movement frame is limited by the locking unit.
Figure 5B:
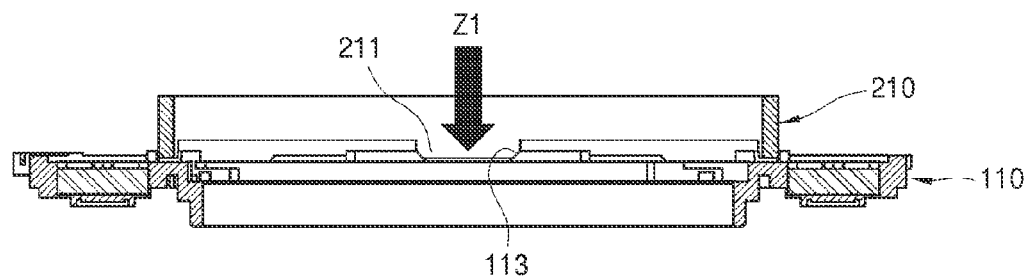
Figure 6A:
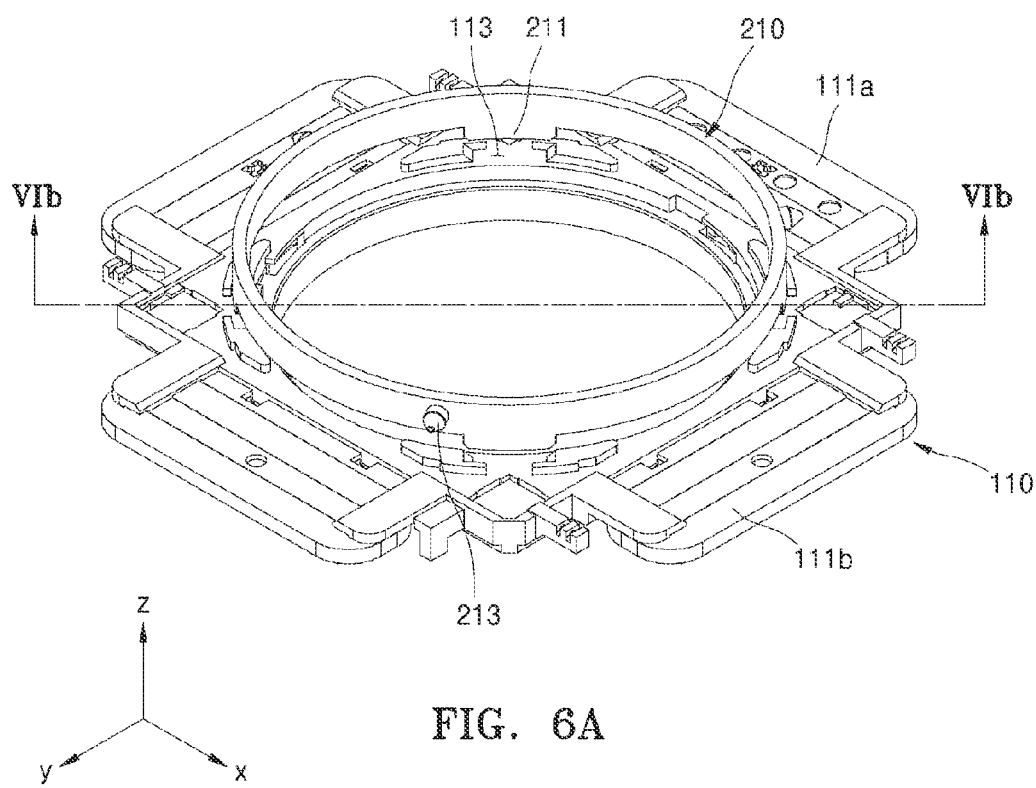
FIGS. 6A and 6B are perspective views and cross-sectional views schematically illustrating an unlocked state of the optical image-stabilizing apparatus of FIG. 1 in which movement of a movement frame is not limited by the locking unit.
Figure 6B:
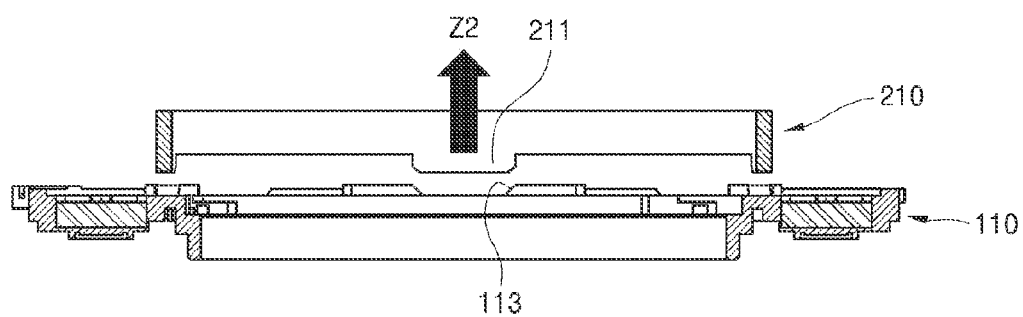

FIGS. 5A and 5B are a perspective view and a cross-sectional view schematically illustrating a locked state of the optical image-stabilizing apparatus 1 in which movement of the movement frame 110 is limited by the locking barrel 210. FIGS. 6A and 6B are a perspective view and a cross-sectional view schematically illustrating an unlocked state of the optical image-stabilizing apparatus 1 in which movement of the movement frame 110 is not limited by the locking barrel 210.

Referring to FIGS. 5A and 5B, the locking barrel 210 may be moved in the direction parallel to the optical axis z and may approach the movement frame 110. As the locking barrel 210 is moved in a direction Z1 in which the locking barrel 210 approaches the movement frame 110, a part of the locking pins 211 of the locking barrel 210 is inserted into the insertion portions 113 of the movement frame 110. Since the locking pins 211 are inserted into and engaged with the insertion portions 113, movement of the movement frame 110 in the directions x and y perpendicular to the optical axis z is limited.

Since the plurality of locking pins 211 are inserted into the plurality of insertion portions 113, movement of the movement frame 110 may be stably limited.

Edges of at least one of the locking pins 211 and the insertion portions 113 may be formed to be inclined with respect to the optical axis z. For example, as illustrated in FIG. 5B, edges of each of the locking pins 211 and the insertion portions 113 may be formed to be inclined with respect to the optical axis z. While the locking pins 211 are inserted into the insertion portions 113, due to the inclined edges, the locking pins 211 may be smoothly inserted into the insertion portions 113.

Referring to FIGS. 6A and 6B, the locking barrel 210 may be moved in the direction parallel to the optical axis z and may be far away from the movement frame 110. As the locking barrel 210 is moved in a direction Z2 in which the locking barrel 210 is far away from the movement frame 110, the locking pins 211 are detached from the insertion portions 113 of the movement frame 110. Thus, the movement frame 110 may be moved in the directions x and y perpendicular to the optical axis z.

In this way, in the current embodiment, the locking pins 211 are configured to be moved in the direction parallel to the optical axis z so that the movement frame 110 may be prevented from being rotated by the locking barrel 210. Unlike the current embodiment, when the locking barrel 210 is rotated so that movement of the movement frame 110 is limited, due to friction between the locking barrel 210 and the movement frame 110, there is a possibility that the movement frame 110 itself will be rotated when the locking barrel 210 is rotated. However, in the current embodiment, the locking barrel 210 is not configured to be rotated so that the movement frame 110 may be prevented from being rotated by the locking barrel 210.

Figure 7:
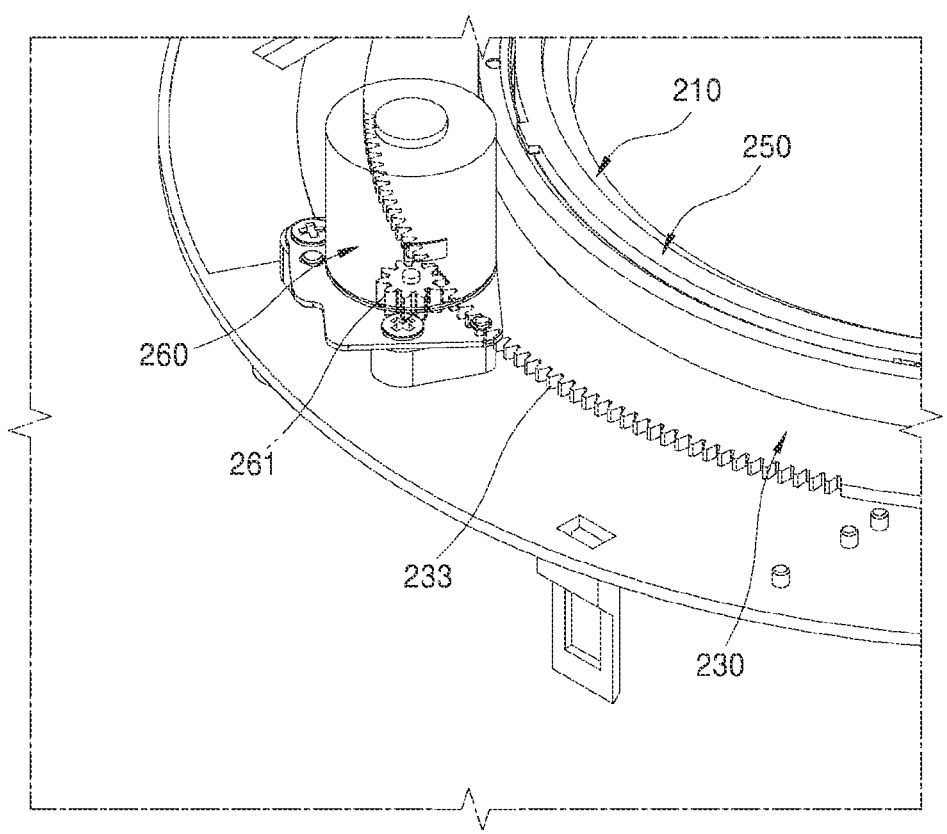
FIG. 7 is an enlarged view of a driving portion of the locking unit of the optical image-stabilizing apparatus of FIG. 2.

FIG. 7 is an enlarged view of the driving portion 260 of the locking unit 200 of the optical image-stabilizing apparatus 1 of FIG. 2. Referring to FIG. 7, the driving portion 260 may be a step motor. In response to electrical signals applied to the driving portion 260, the driving portion 260 may be rotated in one direction or in other direction that is opposite to one direction.

The driving portion 260 may include a gear 261 connected to the gear portion 233 of the driving barrel 230. The driving barrel 230 receives a driving force from the driving portion 260 through the gear portion 233. Since force is transferred to the driving barrel 230, due to a gear connection of the gear 261 of the driving portion 260 and the gear portion 233 of the driving barrel 230, even though a first torque generated in the driving portion 260 is small, a gear ratio of the gear 261 and the gear portion 233 is adjusted so that movement of the movement frame 110, having a large weight, may be limited.

When the driving portion 260 rotates in one direction, the driving barrel 230 is rotated in a first direction, for example, clockwise. When the driving portion 260 rotates in other direction, the driving barrel 230 is rotated in a second direction, for example, counterclockwise.

In the above-described embodiment, a step motor is used as the driving portion 260. However, embodiments are not limited thereto, and various driving principles may be employed. In one example, a driving portion 260a (FIGS. 8A and 8B) may be a voice coil motor (VCM).

Figure 8A:
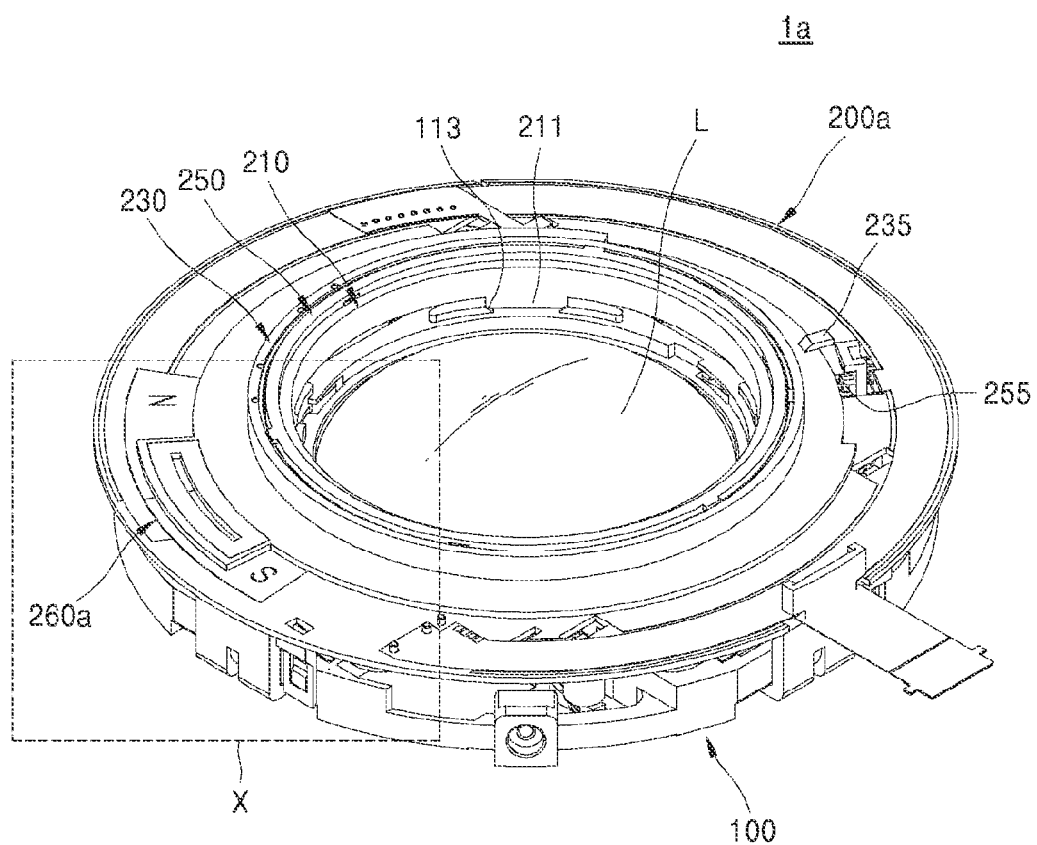
FIG. 8A is a perspective view of an optical image-stabilizing apparatus according to another exemplary embodiment.
Figure 8B:
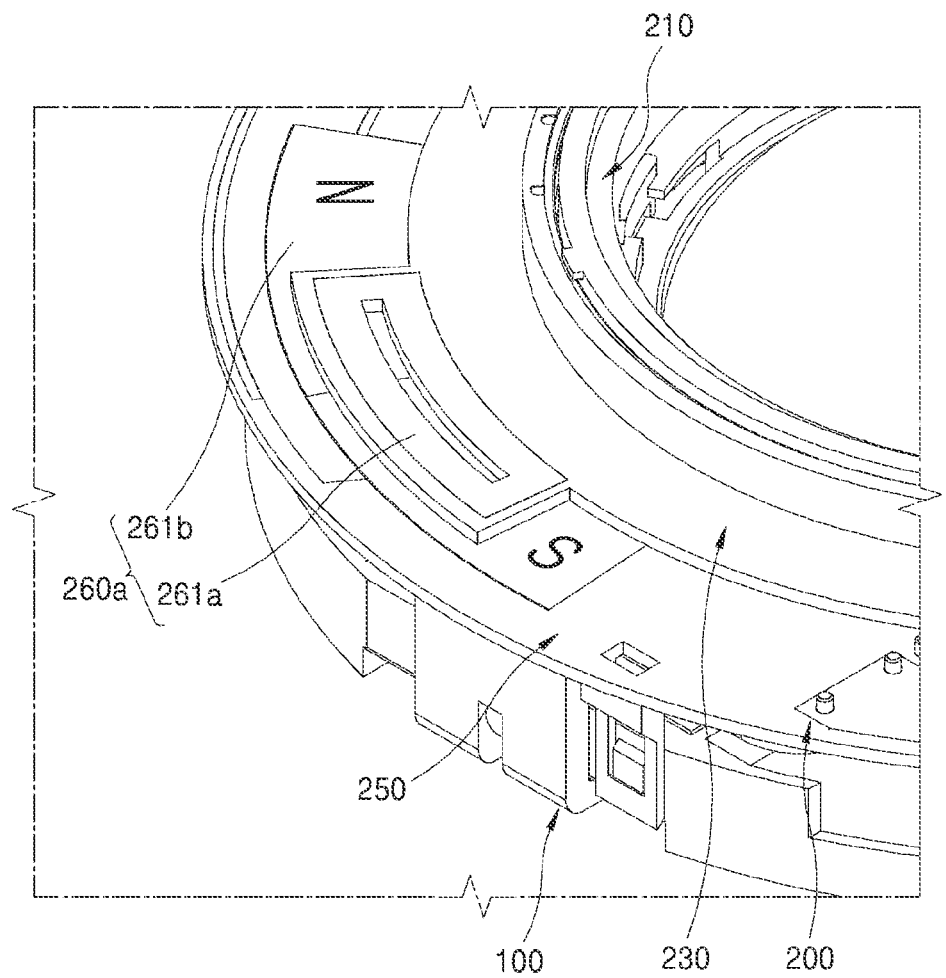
FIG. 8B is an enlarged view of a driving portion of a locking unit of the optical image-stabilizing apparatus illustrated in FIG. 8A.

FIG. 8A is a perspective view of an optical image-stabilizing apparatus 1a according to another exemplary embodiment, and FIG. 8B is an enlarged view of an X area including a driving portion 260a of a locking unit 200a of FIG. 8A, which illustrates an example in which a VCM is employed as the driving portion 260a of the locking unit 200a.

Referring to FIGS. 8A and 8B, the driving portion 260a includes a magnet 261b and a driving coil 261a. The magnet 261b may be assembled with a guide barrel 250, and the driving coil 261a may be assembled with the driving barrel 230. Due to an electromagnetic interaction between the magnet 261b and the driving coil 261a, the driving barrel 230 may be rotated. In this way, a VCM is employed as the driving portion 260a so that elaborate rotation of the driving barrel 230 may be performed.

Figure 9:
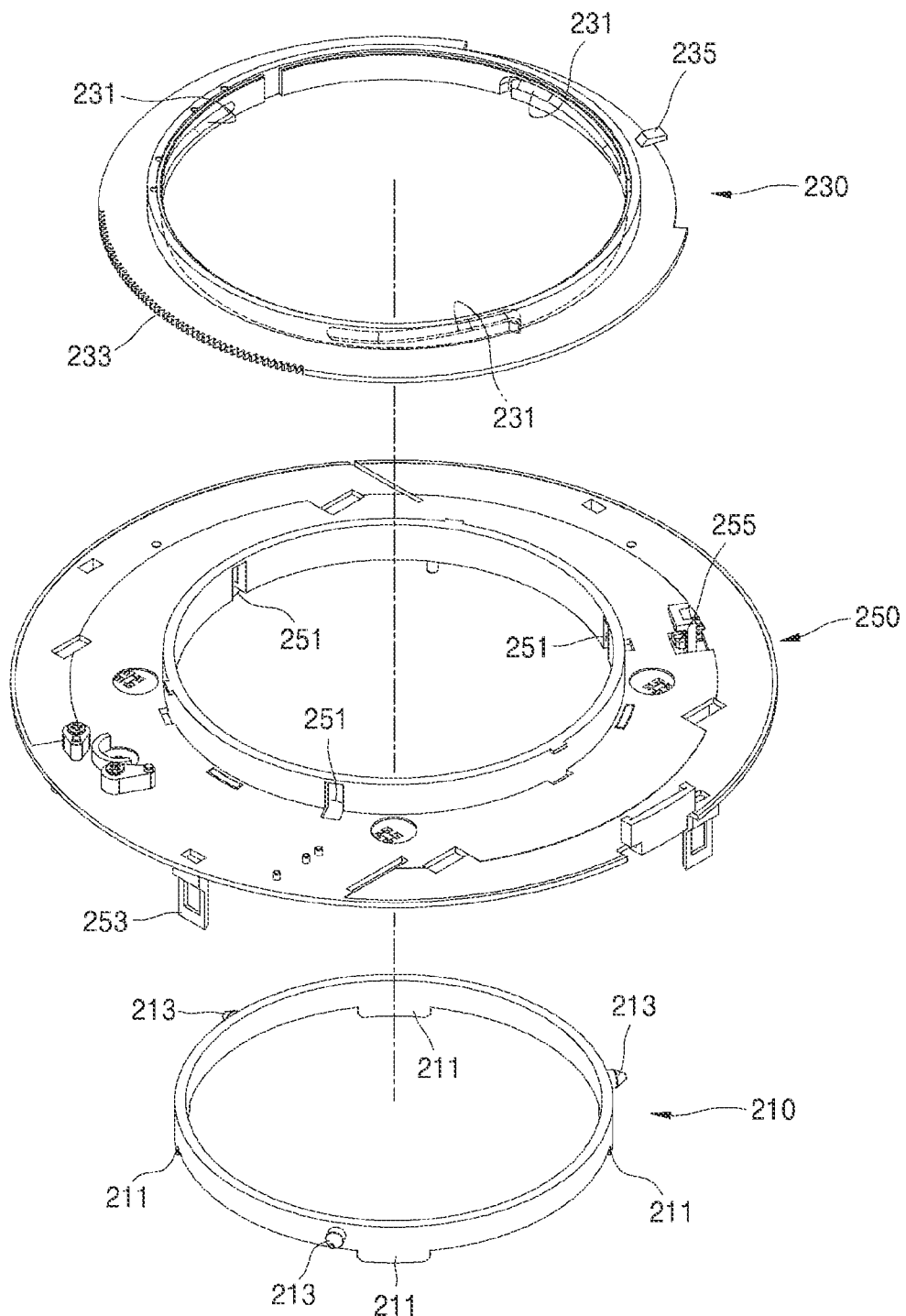
FIG. 9 is an enlarged perspective view of a locking barrel, a driving barrel, and a guide barrel of the locking unit of FIG. 4.

FIG. 9 is an enlarged perspective view of the locking barrel 210, the driving barrel 230, and the guide barrel 250 of the locking unit 200 of FIG. 4. Referring to FIG. 9, the movement pins 213 of the locking barrel 210 pass through the rectilinear guide portions 251 of the guide barrel 250 and are inserted into the inclination guide portions 231 of the driving barrel 230. In this state, the driving barrel 230 is rotated so that the movement pins 213 make a rectilinear motion in the direction parallel to the optical axis z due to the rectilinear guide portions 251 and the inclination guide portions 231. Thus, the locking barrel 210 including the locking pins 211 are moved in the direction parallel to the optical axis z.

A plurality of inclination guide portions 231 and a plurality of movement pins 213 inserted into the inclination guide portions 231 may be present. The plurality of inclination guide portions 231 are disposed in a circumferential direction of the driving barrel 230 and are spaced apart from each other by a predetermined distance. The plurality of movement pins 213 are disposed in the circumferential direction of the locking barrel 210 to be spaced apart from each other by a predetermined distance.

The plurality of inclination guide portions 231 and the plurality of movement pins 213 inserted into the inclination guide portions 231 are used so that force transferred from one driving portion (see 260 of FIG. 7) to the driving barrel 230 may be transferred to the locking barrel 210 through a plurality of areas. That is, the locking barrel 210 may be uniformly pressed from the driving barrel 230 through the plurality of areas. Thus, a phenomenon that occurs due to non-uniform pressing of the locking barrel 210, i.e., a phenomenon in which the locking pins 211 are not inserted into the insertion portions 113 of the movement frame 110 or contact areas other than the insertion portions 113, may be prevented from occurring.

Figure 10A:
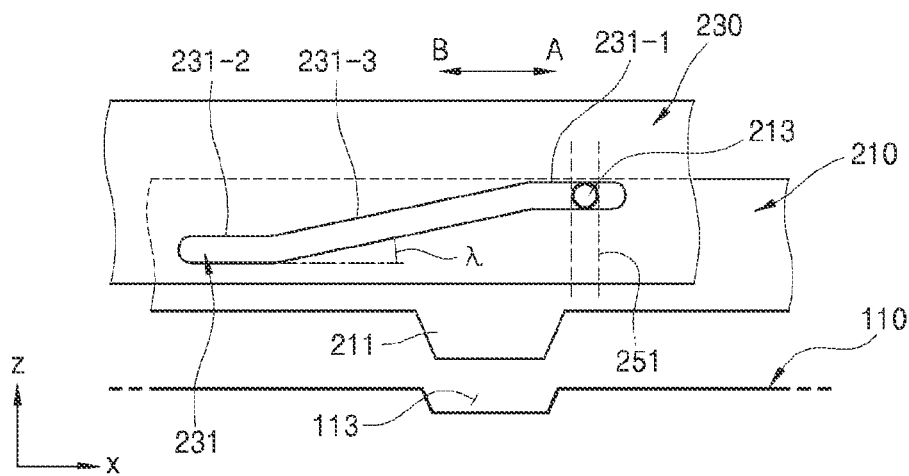
FIGS. 10A through 10C are conceptual views of position movement of the locking barrel caused by rotation of the driving barrel.
Figure 10B:
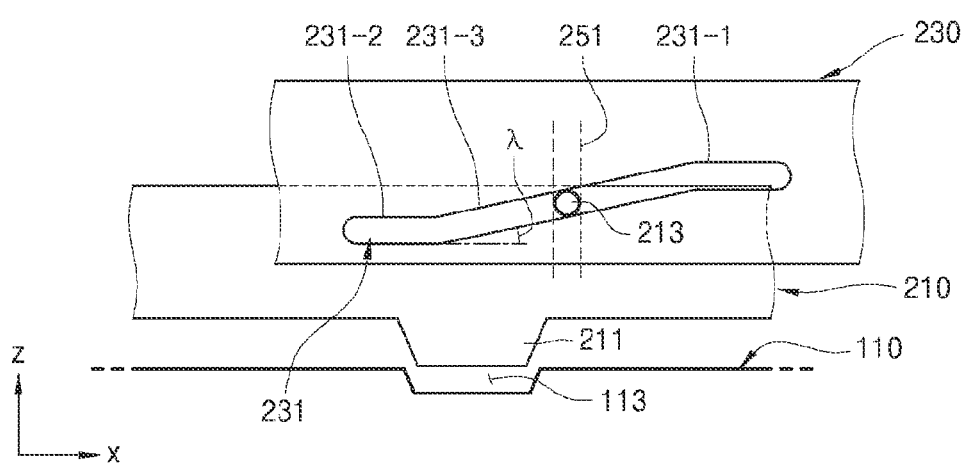
Figure 10C:
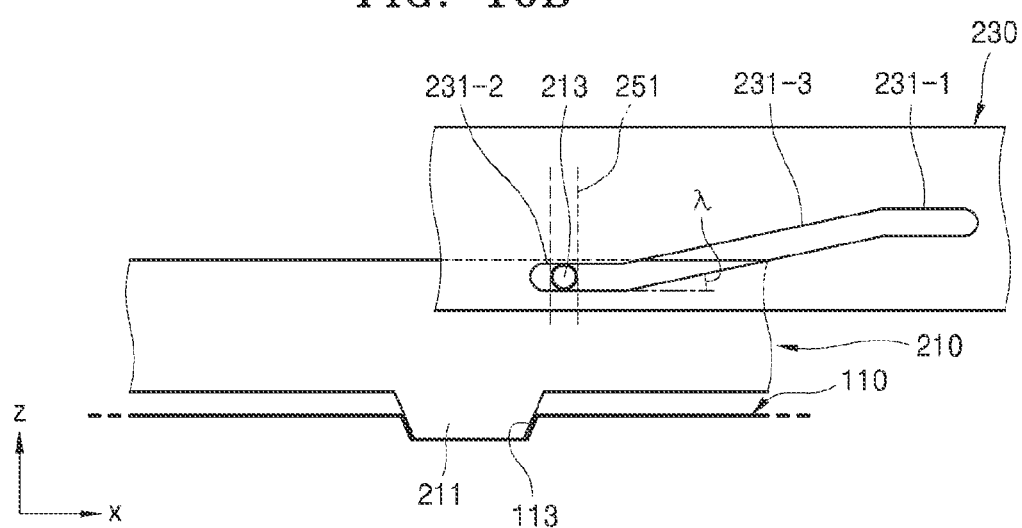

FIGS. 10A through 10C are conceptual views of the movement of the locking barrel 210 caused by the rotation of the driving barrel 230. In FIGS. 10A through 10C, the rectilinear guide portions 251 of the guide barrel 250 disposed between the driving barrel 230 and the locking barrel 210 are indicated by dotted lines.

Referring to FIGS. 10A through 10C, the inclination guide portions 231 of the driving barrel 230 include an inclination section 231-3 that extends in a direction which is inclined with respect to the optical axis z, and first and second extension sections 231-1 and 231-2 that are formed on both ends of the inclination section 231-3 and extend in the direction perpendicular to the optical axis z.

Referring to FIG. 10A, the movement pins 213 are disposed in the first extension section 231-1 of the inclination guide portions 231. In this case, the locking pins 211 of the locking barrel 210 are detached from the insertion portions 113 of the movement frame 110. Since the first extension section 231-1 extends in the direction perpendicular to the optical axis z, the movement pins 213 may be prevented from being unintentionally moved to the inclination section 231-3. Thus, a state in which the locking pins 211 of the locking barrel 210 are detached from the insertion portions 113 of the movement frame 110, may be easily maintained.

In this state, when the driving barrel 230 is rotated in a first direction A, the movement pins 213 are moved to the inclination section 231-3 of the inclination guide portions 231, as illustrated in FIG. 10B. While the movement pins 213 are moved to the inclination section 231-3, a position of the movement pins 213 is moved in the direction parallel to the optical axis z by the rectilinear guide portions 251. Since the rectilinear guide portions 251 are not rotated, movement of the movement pins 213 in the direction crossing the optical axis z, is limited by the rectilinear guide portions 251.

A movement speed of the locking barrel 210 including the movement pins 213 may be changed according to the shape of the inclination section 231-3, for example, an inclination angle X of the inclination section 231-3. Thus, the inclination angle X of the inclination section 231-3 is changed so that the movement speed of the locking barrel 210 may be adjusted.

As the driving barrel 230 is further rotated in the first direction A, the movement pins 213 are disposed in the second extension section 231-2, as illustrated in FIG. 10C.

While the driving barrel 230 is rotated in the first direction A, the locking pins 211 of the locking barrel 210 descend in the direction parallel to the optical axis z and are inserted into the insertion portions 113 of the movement frame 110.

Since the second extension section 231-2 extends in the direction perpendicular to the optical axis z, the movement pins 213 may be prevented from being unintentionally moved to the inclination section 231-3. Thus, a state in which the locking pins 211 of the locking barrel 210 are inserted into the insertion portions 113 of the movement frame 110, may be easily maintained.

When, in the state of FIG. 10C, the driving barrel 230 is rotated in a second direction B that is opposite to the first direction A, the movement pins 213 are moved in a reverse order. That is, the movement pins 213 pass through the inclination section 231-3 of the inclination guide portions 231 and are disposed in the first extension section 231-1 of the inclination guide portions 231, as illustrated in FIG. 10A. While the driving barrel 230 is rotated in the second direction B, the locking pins 211 of the locking barrel 210 ascend in the direction parallel to the optical axis z and are detached from the insertion portions 113 of the movement frame 110.

As described above, in the current embodiment, a driving force for rotation of the driving portion 260 may be changed into a driving force for a rectilinear motion of the locking barrel 210. Thus, the locking pins 211 of the locking barrel 210 may be moved in the direction parallel to the optical axis z.

While the direction of force is changed, the locking barrel 210 may be pressed with a different force from the force transferred from the driving portion 260 to the driving barrel 230.

Force applied to the locking barrel 210 in the direction parallel to the optical axis z by a rotational force of the driving portion 260 will be described with reference to FIGS. 11 and 12.

Figure 11:
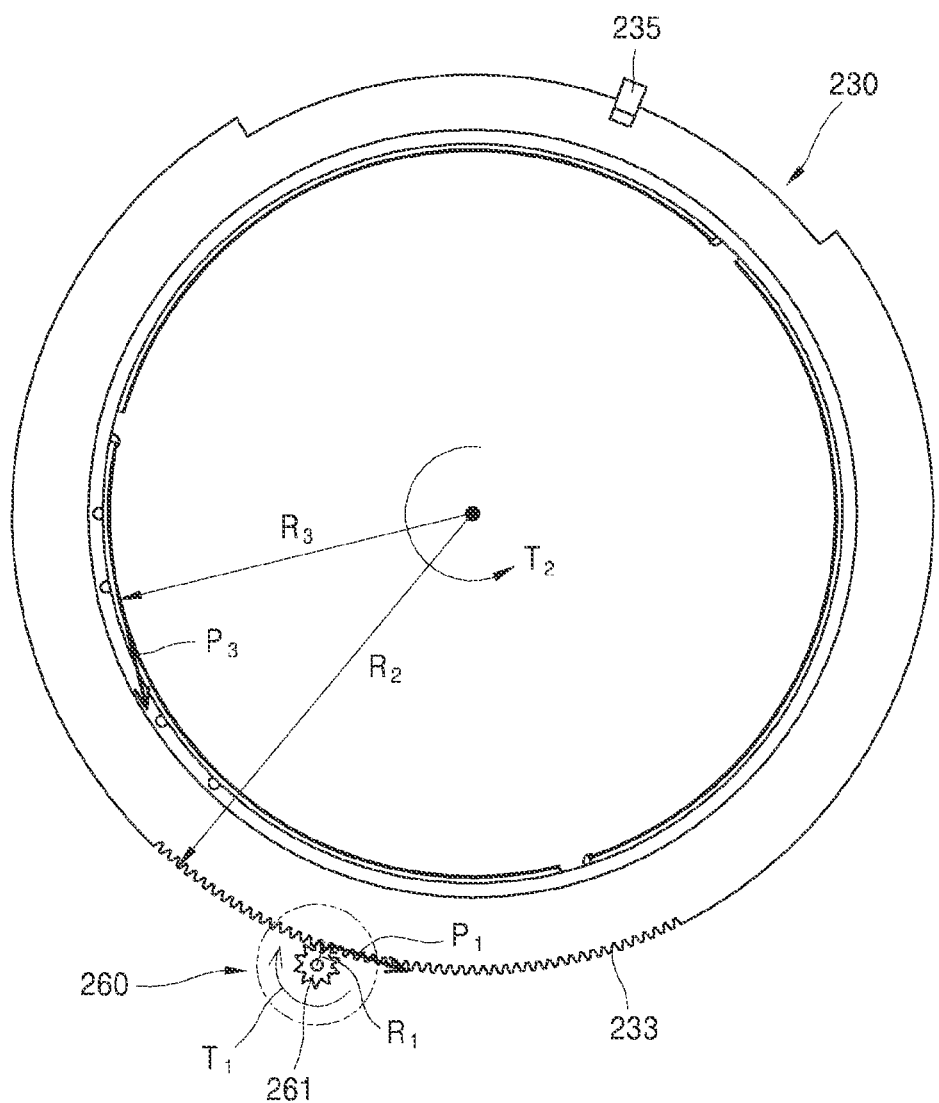
FIG. 11 is a conceptual plan view of a driving portion and a driving barrel according to an exemplary embodiment.

FIG. 11 is a conceptual plan view of the driving portion 260 and the driving barrel 230 according to an exemplary embodiment. Referring to FIG. 11, a first torque T1 is generated when power is applied to the driving portion 260. Force P3 applied to the inclination guide portions 231 of the driving barrel 230 in a tangential direction of a circumference by the first torque T1 generated in the driving portion 260 may be determined by the following equations (1), (2), and (3).

$$P_1 = T_1/R_1 = T_2/R_2 = P_2 \quad (1)$$

$$T_2 = P_1 * R_2 = P_2 * R_3 \quad (2)$$

$$P_3 = P_1 * R_2/R_3 = (R_2 * T_1)/(R_1 * R_3) \quad (3),$$

where $T_1$ is a first torque generated in the driving portion 260, $R_1$ is a radius of the gear 261 of the driving portion 260, $T_2$ is a second torque applied to the driving barrel 230, $R_2$ is a radius of the gear portion 233 of the driving barrel 230, and $R_3$ is a radius of the inclination guide portions 231 of the driving barrel 230. $P_1$ is a force applied in a tangential direction of a circumference of the gear 261 of the driving portion 260, and $P_2$ is a force applied in a tangential direction of a circumference of the gear portion 233, and $P_3$ is a force applied in a tangential direction of a circumference of the inclination guide portions 231.

As electrical signals are applied to the driving portion 260, the first torque $T_1$ is generated in the driving portion 260 clockwise. Since the force $P_1$ in the tangential direction of the circumference of the gear 261 of the driving portion 260 is equal to the force $P_2$ in the tangential direction of the circumference of the gear 233 of the driving barrel 230, the second torque $T_2$ is applied to the driving barrel 230 according to a ratio of the radius $R_1$ of the gear 261 of the driving portion 260 with respect to the radius $R_2$ of the gear portion 233 of the driving barrel 230.

Since the same second torque $T_2$ is applied to the gear portion 233 and the inclination guide portions 231 of the driving barrel 230, the force $P_3$ applied in the tangential direction of the circumference of the inclination guide portions 231 is determined by a ratio of the radius $R_2$ of the gear portion 233 with respect to the radius $R_3$ of the inclination guide portions 231 and the force $P_1$ in the tangential direction of the circumference of the gear 261 of the driving portion 260. The force $P_1$ in the tangential direction of the circumference of the driving portion 260 is determined by a ratio of the first torque $T_1$ generated in the driving portion 260 with respect to the radius $R_1$ of the gear 261 of the driving portion 260.

Thus, even though the same electrical signals are applied to the driving portion 260 and the first torque $T_1$ is the same, the force $P_3$ transferred to the inclination guide portions 231 may be adjusted by the radius $R_1$ of the gear 261 of the driving portion 260, the radius $R_2$ of the gear portion 233 of the driving barrel 230, and the radius $R_3$ of the inclination guide portions 231.

Figure 12:
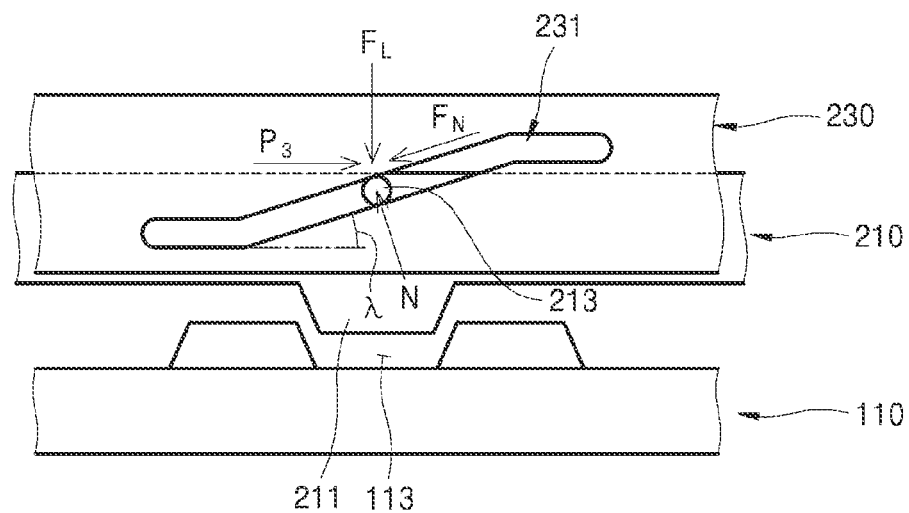
FIG. 12 is a view illustrating a force applied to a locking barrel by an inclination guide portion in a direction parallel to an optical axis according to an exemplary embodiment.

FIG. 12 is a view illustrating force applied to the locking barrel 210 by the inclination guide portions 231 in the direction parallel to the optical axis z according to an exemplary embodiment.

As described above, as the driving barrel 230 is rotated by the driving portion 260, predetermined force $P_3$ is transferred to the inclination guide portions 231. The movement pins 213 inserted into the inclination guide portions 231 contact the inclination guide portions 231 and are pressed by top surfaces of the inclination guide portions 231 as the driving barrel 230 is rotated, as illustrated in FIG. 12. In this procedure, force is applied to the movement pins 213 in the direction parallel to the optical axis z. Force applied to the movement pins 213 in the direction parallel to the optical axis z may be determined by the following equations (4), (5), and (6).

$$\Sigma F_H = P_3 - N \sin \lambda \pm fN \cos \lambda \quad (4)$$

$$\Sigma F_V = F_L \pm fN \sin \lambda - N \cos 2 \quad (5)$$

$$F_L = P_3 \frac{\cos\lambda \mp f\sin\lambda}{f\cos\lambda \pm \sin\lambda}, \quad (6)$$

where it is assumed that force applied to the movement pins 213 is in an equilibrium state. Thus, it is assumed that $\Sigma F_H$ is the sum of the forces applied to the movement pins 213 in the direction perpendicular to the optical axis z, i.e., in a horizontal direction it is 0, and $\Sigma F_V$ is the sum of forces applied to the movement pins 213 in the direction parallel to the optical axis z, i.e., in a vertical direction it is 0.

In addition, $P_3$ is a force transferred to the movement pins 213 by the inclination guide portions 231 in a direction perpendicular to the optical axis z, and $F_L$ is a force applied to the movement pins 213 by the inclination guide portions 231 in a direction parallel to the optical axis z. N is a vertical drag force, and f is a frictional coefficient between the inclination guide portions 231 and the movement pins 213, and $\lambda$ is an inclination angle of the inclination guide portions 231. In equations (4), (5), and (6), ± varies according to a direction of a frictional force.

Referring to equation (6), force $F_L$ applied to the movement pins 213 by the inclination guide portions 231 in the direction parallel to the optical axis z may be determined by $P_3$ applied to the movement pins 213 by the inclination guide portions 231 in the direction perpendicular to the optical axis z, the inclination angle X and the frictional coefficient f of the inclination guide portions 231.

Thus, the inclination angle $\lambda$ of the inclination guide portions 231 is adjusted so that a larger force than the force $P_3$ applied by the inclination guide portions 231 in the direction perpendicular to the optical axis z may be transferred to the movement pins 213 in the direction parallel to the optical axis z.

For example, when the first torque $T_1$ generated by the driving portion 260 is set to 45 gf·mm, the radius $R_1$ of the gear 261 of the driving portion 260 is set to 1.25 mm, the radius $R_2$ of the gear portion 233 of the driving barrel 230 is set to 32.5 mm, the radius $R_3$ of the inclination guide portions 231 of the driving barrel 230 is set to 25 mm, the inclination angle $\lambda$ of the inclination guide portions 231 is set to 5° and the frictional coefficient f between the inclination guide portions 231 and the movement pins 213 is set to 0.3, the force $P_1$ applied to the driving barrel 230 by the driving portion 260 is 36 gf, and the force $P_3$ applied to the inclination guide portions 231 of the driving barrel 230 is 46.8 gf, and the force $F_L$ applied to the movement pins 213 by the inclination guide portions 231 in the direction parallel to the optical axis z is 117 gf. Thus, it may be known that, while force transferred from the driving portion 260 is transferred to the inclination guide portions 231 of the driving barrel 230, the force is increased by about 1.3 times ($=P_3/P_1$) and while the force $P_3$ transferred to the inclination guide portions 231 is transferred to the movement pins 213, the force is increased by about 2.5 times ($=F_L/P_3$). As a result, while the force $P_1$ transferred from the driving portion 260 is transferred to the movement pins 213 via the guide barrel 250, the force is increased by about 3.25 times ($=F_L/P_1$).

In the above-described exemplary embodiment, equations have been described in a case where the driving barrel 230 is rotated in the first direction. However, exemplary embodiments are not limited thereto, and equations may also be applied to a case where the driving barrel 230 is rotated in the second direction. Even when the driving barrel 230 is rotated in the second direction, a direction of force may be changed. However, the force $F_L$ applied to the movement pins 213 by the inclination guide portions 231 in the direction parallel to the optical axis z may be determined by the force $P_3$ applied to the movement pins 213 by the inclination guide portions 231 in the direction perpendicular to the optical axis z and the inclination angle $\lambda$ and the frictional coefficient f of the inclination guide portions 231. A description thereto is substantially redundant with the above description and thus will be omitted.

Figure 13:
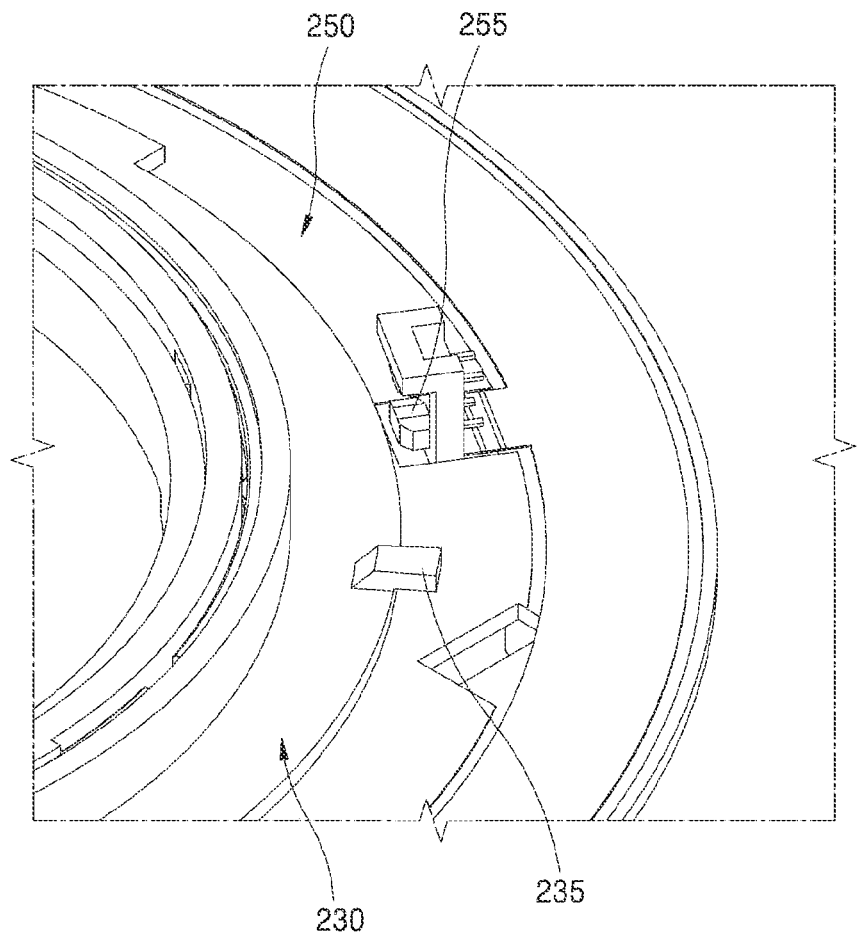
FIG. 13 is an enlarged view of a part of the locking unit of FIG. 2.

FIG. 13 is an enlarged view of a part of the locking unit 200 of FIG. 2. Referring to FIG. 13, the guide barrel 250 may further include a position sensor 255 that detects a position of the driving barrel 230, for example, a rotation position of the driving barrel 230.

For example, the position sensor 255 may include an optical sensor. At least one interference portion 235 may be disposed on an outer circumferential surface of the driving barrel 230. The position sensor 255 may be disposed on a rotation path of the interference portion 235. The position sensor 255 may detect the position of the interference portion 235, thereby detecting the rotation position of the driving barrel 230.

A position in the direction parallel to the optical axis z of the locking barrel 210 may be known based on the rotation position of the driving barrel 230. Thus, the locking pins 211 of the locking barrel 210 may be exactly inserted into the insertion portions 113 of the movement frame 110 or may be detached from the insertion portions 113 of the movement frame 110 based on information detected by the position sensor 255. When the locking pins 211 are inserted into the insertion portions 113, electrical signals for position movement of the movement frame 110 may be prevented from being applied to the driving portion 260.

In the above-described embodiments, the inclination guide portions 231 are included in the driving barrel 230, and the movement pins 213 are included in the locking barrel 210. In addition, the locking pins 211 are included in the locking barrel 210, and the insertion portions 113 are included in the movement frame 110. However, arrangements thereof are not limited thereto and may be changed as needed. For example, although not shown in the drawings, the movement pins 213 may be included in the driving barrel 230, and the inclination guide portions 231 into which the movement pins 213 are inserted, may be included in the locking barrel 210. In addition, the insertion portions 113 may be included in the locking barrel 210, and the locking pins 211 may be included in the movement frame 110.

In addition, in the above-described exemplary embodiments, the locking unit 200 is disposed on the movement frame 110. However, arrangement of the locking unit 200 may also be changed as needed.

Figure 14:
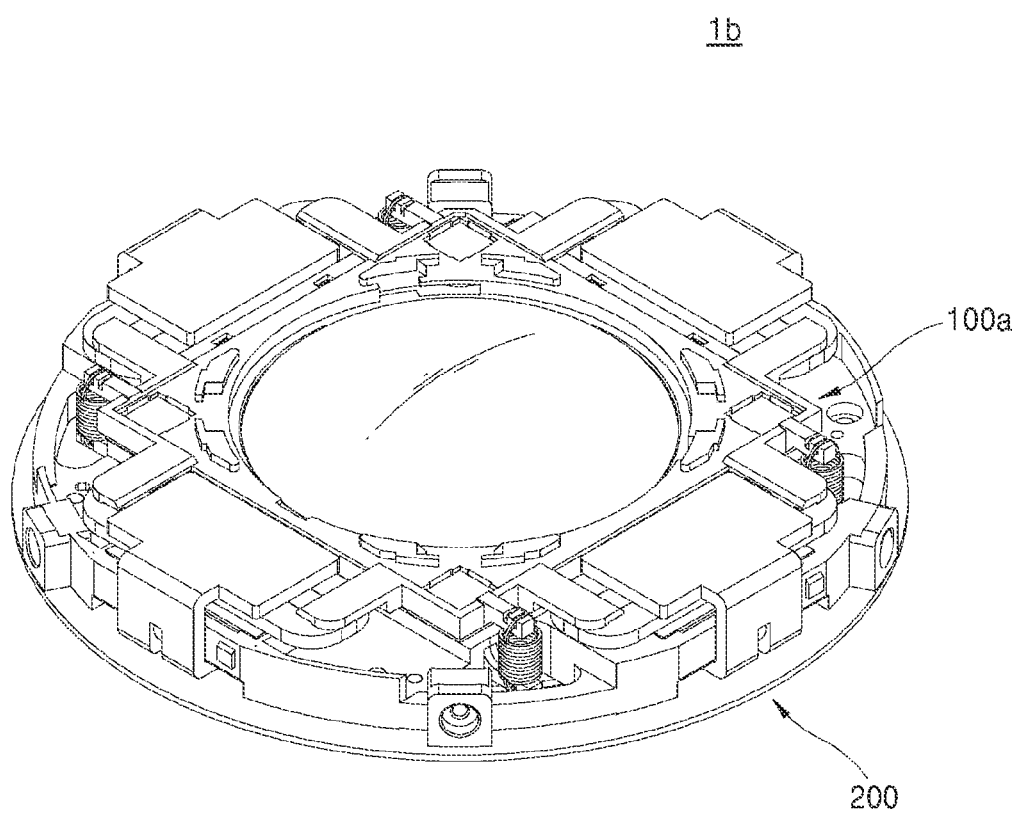
FIG. 14 is a perspective view schematically illustrating an example in which arrangement of the locking unit is changed, in the optical image-stabilizing apparatus according to an exemplary embodiment.
Figure 15A:
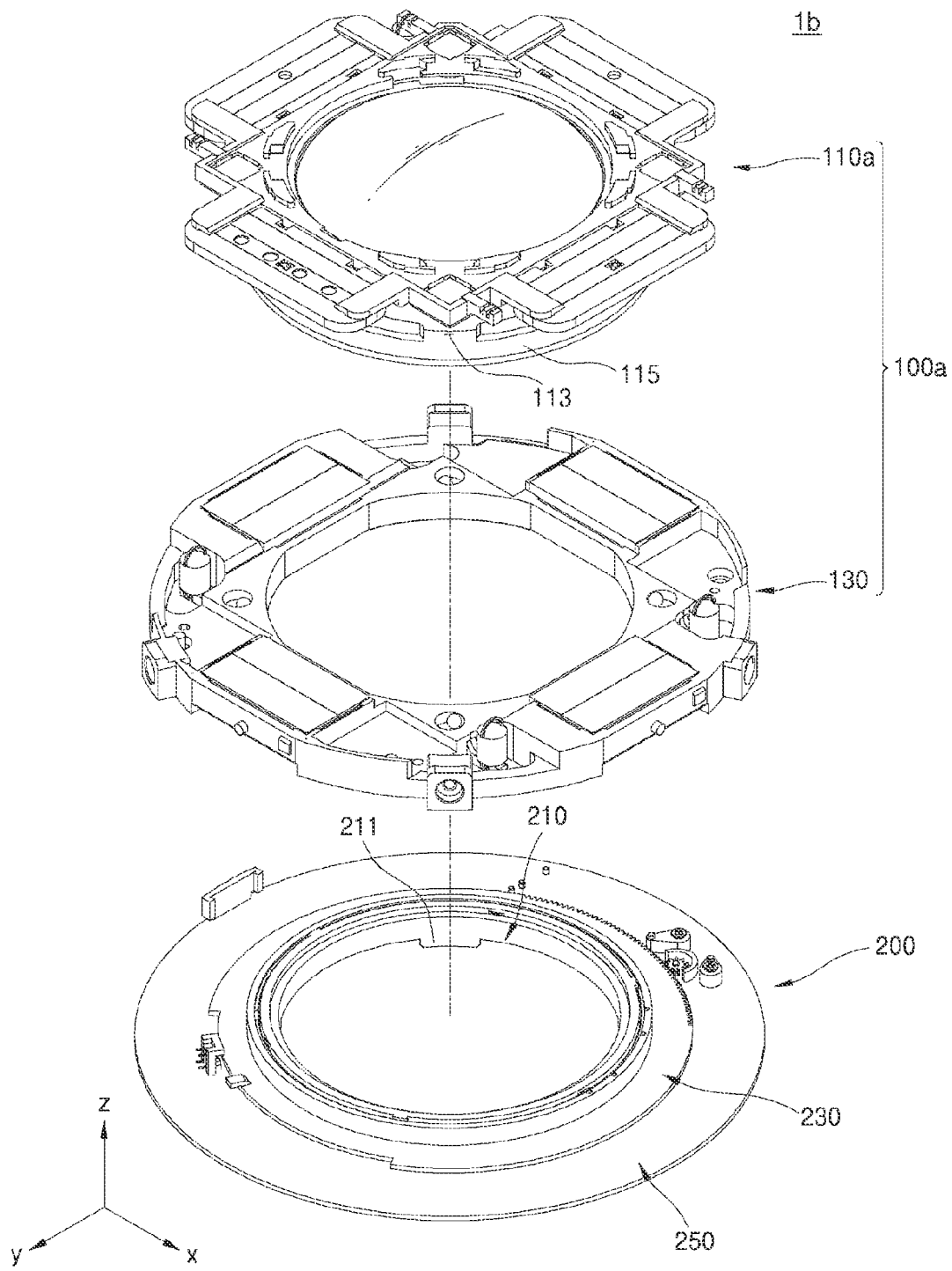
FIG. 15A is an exploded perspective view of FIG. 14.
Figure 15B:
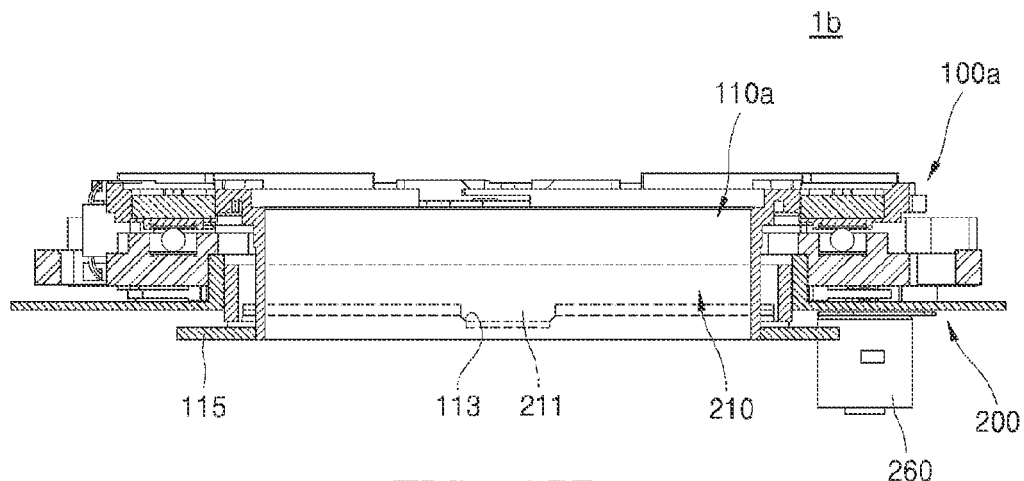
FIG. 15B is a cross-sectional view of FIG. 14.

FIG. 14 is a perspective view schematically illustrating an example in which arrangement of the locking unit 200 is changed in an optical image-stabilizing apparatus 1b according to another exemplary embodiment, and FIG. 15A is an exploded perspective view of FIG. 14, and FIG. 15B is a cross-sectional view of FIG. 14.

Referring to FIGS. 14, 15A, and 15B, the optical image-stabilizing apparatus 1b includes an optical image-stabilizing unit 100a and a locking unit 200. The optical image-stabilizing unit 1b includes a movement frame 110a and a support frame 130. The locking unit 200 includes a driving portion 260, a driving barrel 230, a guide barrel 250, and a locking barrel 210.

A flange 115 that protrudes in the directions x and y perpendicular to the optical axis z may be disposed under the movement frame 110a in a direction of the optical axis z of the movement frame 110a. Insertion portions 113 into which locking pins 211 of the locking barrel 210 may be inserted, may be formed in a top surface of the flange 115.

The locking unit 200 may be disposed between the movement frame 110a and the flange 115.

As the driving barrel 230 is rotated in the first direction, the locking barrel 210 descends. Thus, the locking pins 211 of the locking barrel 210 are inserted into the insertion portions 113 formed in the flange 115. Thus, movement of the movement frame 110a in the directions x and y perpendicular to the optical axis z is limited.

As the driving barrel 230 is rotated in the second direction, the locking barrel 210 ascends. Thus, the locking pins 211 of the locking barrel 210 are detached from the insertion portions 113 formed in the flange 115. Thus, movement of the movement frame 110 in the directions x and y perpendicular to the optical axis z is not limited.

Figure 16:
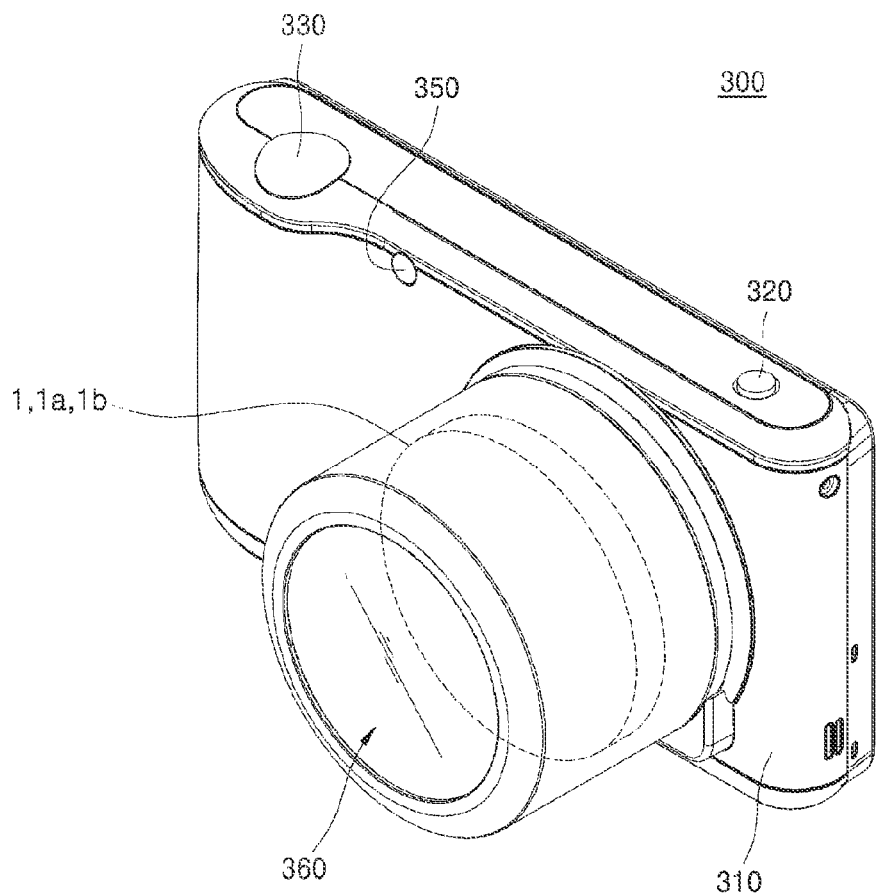
FIG. 16 is a perspective view of a photographing apparatus having an optical image-stabilizing apparatus, according to an exemplary embodiment.

FIG. 16 is a perspective view of a photographing apparatus 300 including the optical image-stabilizing apparatus 1, 1a or 1b, according to an exemplary embodiment.

Referring to FIG. 16, the photographing apparatus 300 according to the current embodiment may include a power switch 320 disposed at one side of a top end of a camera main body 310 and a shutter release button 330 disposed at the other side of the top end of the camera main body 310. In addition, a lens unit 360 that may perform a zooming operation may be disposed in the center of the front of the camera main body 310. A view finder (not shown) may be disposed behind the camera main body 310.

The lens unit 360 may include a heavy lens having a relatively large weight. For example, the lens unit 360 may include a large caliber lens, a telescopic lens or a lens having a large F-number.

The optical image-stabilizing apparatus 1, 1a or 1b according to the above exemplary embodiments and modifications thereof may be disposed in the photographing apparatus 300. Thus, definition of images may be prevented from being lowered by shaking of the photographing apparatus 300 including user's hand shaking, and when the optical image-stabilizing unit 100 is not used, an operation of the optical image-stabilizing unit 100 may be stably blocked.

As described above, in an optical image-stabilizing apparatus and a photographing apparatus according to the one or more exemplary embodiments, a locking barrel that limits movement of an optical image-stabilizing unit is connected to a rotating driving barrel so that a driving force in a direction parallel to an optical axis may be transferred to a plurality of points and thus fastening of a locking unit and the optical image-stabilizing unit may have stable characteristics.

For the purposes of promoting an understanding of the principles of the inventive concept, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical". Expressions used herein, such as "comprising" and "having", are used to be understood as the terms of open-type closing portions of description.

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An optical image-stabilizing apparatus comprising:
   an optical image-stabilizing unit comprising a movement frame and a support frame configured to support the movement frame to be movable in a direction perpendicular to an optical axis; and
   a locking unit capable of locking the movement frame to not be moved in the direction perpendicular to the optical axis,
   wherein the locking unit comprises:
   a locking barrel movable in a direction parallel to the optical axis and configured to limit movement of the movement frame according to a position in the direction parallel to the optical axis;
   a driving barrel rotatable and configured to transfer a driving force to the locking barrel so that the locking barrel is moved in the direction parallel to the optical axis; and
   a guide barrel between the locking barrel and the driving barrel and comprising rectilinear guide portions extending in the direction parallel to the optical axis so that the locking barrel is moved in the direction parallel to the optical axis.

2. The optical image-stabilizing apparatus of claim 1, wherein the locking barrel comprises at least one locking pin protruding toward the movement frame, and the movement frame comprises at least one insertion portion into which at least a part of the locking pin is inserted.

3. The optical image-stabilizing apparatus of claim 2, wherein,
when the driving barrel is rotated in a first direction, the locking pin of the locking barrel is inserted into the insertion portion of the movement frame, and
when the driving barrel is rotated in a second direction, the locking pin of the locking barrel is detached from the insertion portion of the movement frame.

4. The optical image-stabilizing apparatus of claim 1, wherein,
a plurality of inclination guide portions, at least a part of which are inclined with respect to the optical axis, are formed in one of the driving barrel and the locking barrel, and
a plurality of movement pins inserted into the plurality of inclination guide portions are formed in the other one of the driving barrel and the locking barrel.

5. The optical image-stabilizing apparatus of claim 4, wherein the plurality of movement pins pass through the rectilinear guide portions and are inserted into the inclination guide portions.

6. The optical image-stabilizing apparatus of claim 4, wherein the inclination guide portions comprise:
an inclination section extending in a direction in which the inclination guide portions are inclined with respect to the optical axis; and
first and second extension sections on both ends of the inclination section and extending in the direction perpendicular to the optical axis.

7. The optical image-stabilizing apparatus of claim 1, further comprising a driving portion configured to provide a rotational driving force to the driving barrel.

8. The optical image-stabilizing apparatus of claim 7, wherein the driving portion comprises at least one of a step motor and a voice coil motor (VCM).

9. The optical image-stabilizing apparatus of claim 1, wherein the driving barrel is disposed at an outer edge of the locking barrel.

10. The optical image-stabilizing apparatus of claim 1, wherein the movement frame and the locking barrel are disposed in the direction parallel to the optical axis.

11. The optical image-stabilizing apparatus of claim 1, wherein the locking unit further comprises a position sensor configured to detect a position of the driving barrel.

12. A photographing apparatus comprising the optical image-stabilizing apparatus of claim 1.

13. The photographing apparatus of claim 12, wherein the locking barrel comprises at least one locking pin protruding toward the movement frame, and the movement frame comprises at least one insertion portion into which at least a part of the locking pin is inserted.

14. The photographing apparatus of claim 13, wherein,
when the driving barrel is rotated in a first direction, the locking pin of the locking barrel is inserted into the insertion portion of the movement frame, and
when the driving barrel is rotated in a second direction, the locking pin of the locking barrel is detached from the insertion portion of the movement frame.

15. The photographing apparatus of claim 12, wherein,
a plurality of inclination guide portions, at least a part of which are inclined with respect to the optical axis, are formed in one of the driving barrel and the locking barrel, and
a plurality of movement pins inserted into the plurality of inclination guide portions are formed in the other one of the driving barrel and the locking barrel.

16. The photographing apparatus of claim 15, wherein the plurality of movement pins pass through the rectilinear guide portions and are inserted into the inclination guide portions.

17. The photographing apparatus of claim 15, wherein the inclination guide portions comprise:
an inclination section extending in a direction in which the inclination guide portions are inclined with respect to the optical axis; and
first and second extension sections on both ends of the inclination section and extending in the direction perpendicular to the optical axis.

18. The photographing apparatus of claim 12, further comprising a driving portion that provides a rotational driving force to the driving barrel, wherein the driving portion comprises at least one of a step motor and a voice coil motor (VCM).

19. The photographing apparatus of claim 12, wherein the driving barrel is at an outer edge of the locking barrel, and the movement frame and the locking barrel are in the direction parallel to the optical axis.

20. The photographing apparatus of claim 12, wherein the locking unit further comprises a position sensor that detects a position of the driving barrel.

* * * * *